(12) United States Patent
Gorbet

(10) Patent No.: US 7,172,229 B2
(45) Date of Patent: Feb. 6, 2007

(54) ADJUSTABLE SIFTING SHOVEL

(76) Inventor: Charles Elton Gorbet, 3236 Altura Ave., El Paso, TX (US) 79930

( * ) Notice: Subject to any disclaimer, the term of this patent is extended or adjusted under 35 U.S.C. 154(b) by 0 days.

(21) Appl. No.: 11/173,509

(22) Filed: Jul. 1, 2005

(65) Prior Publication Data

US 2006/0001282 A1   Jan. 5, 2006

Related U.S. Application Data

(60) Provisional application No. 60/584,973, filed on Jul. 1, 2004.

(51) Int. Cl.
*B07B 1/49* (2006.01)
(52) U.S. Cl. .................................... 294/49; 209/419
(58) Field of Classification Search .................. 294/55, 294/49, 50.9, 59; 209/417, 418, 419; 119/166
See application file for complete search history.

(56) References Cited

U.S. PATENT DOCUMENTS

| | | | | |
|---|---|---|---|---|
| 4,602,593 A | * | 7/1986 | Gross | 119/166 |
| 5,325,815 A | * | 7/1994 | Gumpesberger | 119/166 |
| 5,503,110 A | * | 4/1996 | Miller | 119/166 |
| 5,799,610 A | * | 9/1998 | Poulos | 119/166 |
| 2002/0014025 A1 | * | 2/2002 | Silva, Jr. | 37/265 |
| 2003/0121834 A1 | * | 7/2003 | Greenberg | 209/235 |

* cited by examiner

*Primary Examiner*—Gene O. Crawford
*Assistant Examiner*—Esther Onyinyechi Okezie
(74) *Attorney, Agent, or Firm*—Barber Legal; Craig W. Barber

(57) ABSTRACT

The present invention teaches a shovel having a scoop with a bottom perforated by apertures and a movable sifting plate held in one of a plurality of possible positions by means of a retainer plate. The sifting plate may have apertures which do not overlap the apertures of the scoop in a first position, thus keeping the bottom of the shovel scoop closed for use as a shovel. In a second position, the sifting plate apertures may overlap the apertures of the scoop bottom so as to provide a degree of sifting ability. Either set of apertures may have a screen thereacross. The retaining plate may be biased by a spring so as to hold the sifting plate in position.

5 Claims, 4 Drawing Sheets

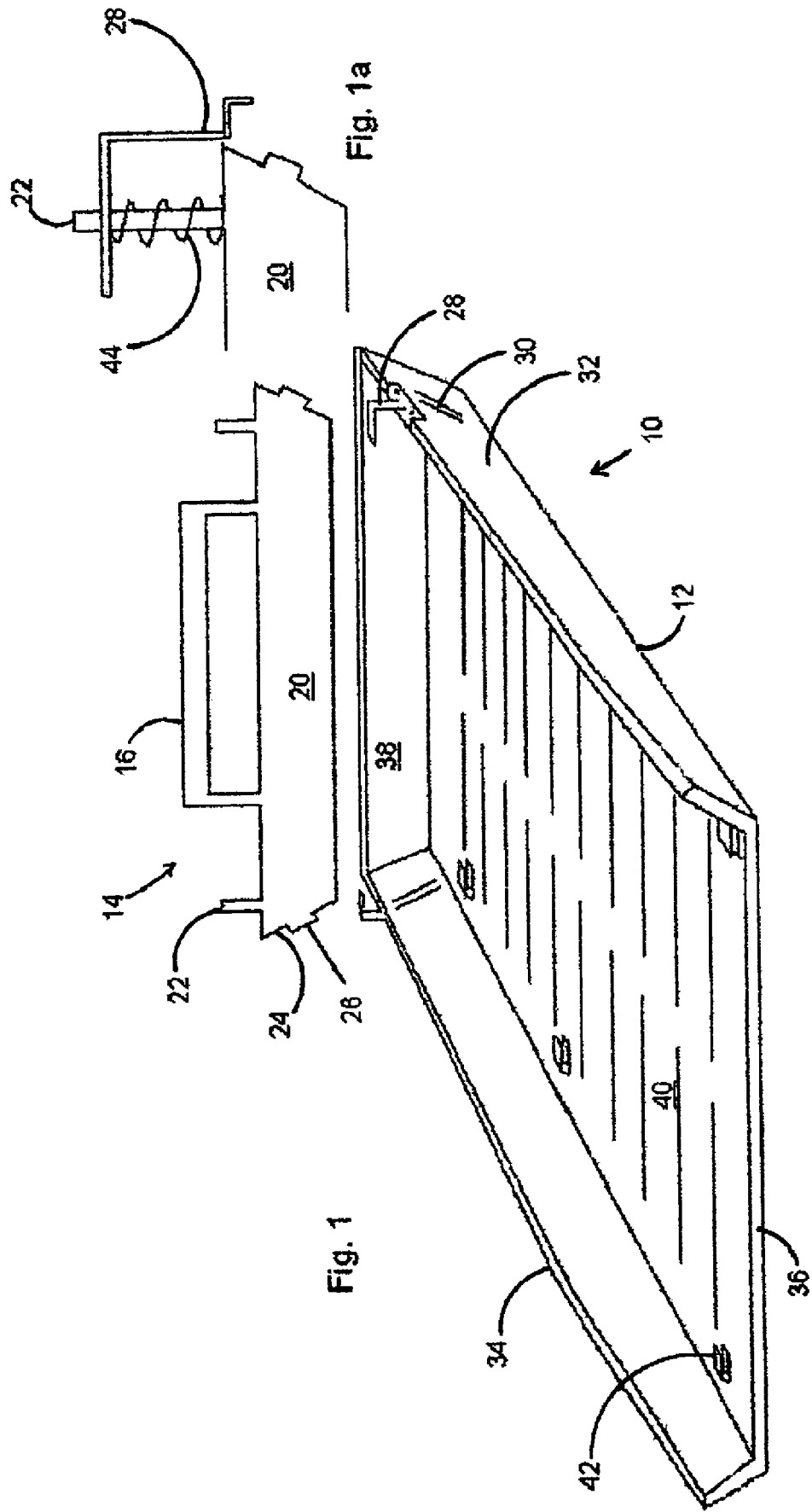

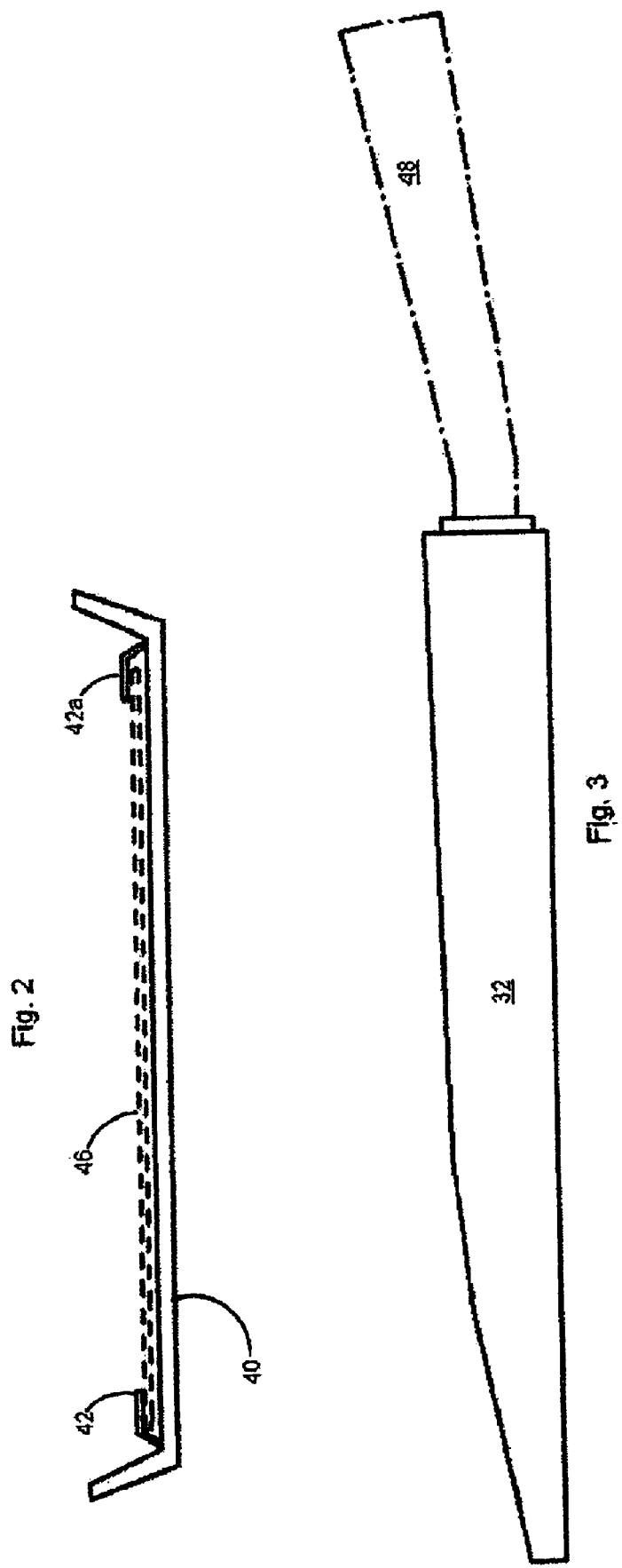

60a, b, c, d

32

40

66　　68

36

ADJUSTABLE SIFTING SHOVEL

CROSS-REFERENCE TO RELATED APPLICATIONS

This application claims the priority and benefit of U.S. Provisional Application No. 60/584,973 filed Jul. 1, 2004 in the name of the same inventor, Charles E. Gorbet, and entitled SHIVEL, the disclosure of which is incorporated herein by this reference thereto.

FIELD OF THE INVENTION

This invention relates generally to shovels and specifically to adjustable shovels.

Statement Regarding Federally Funded Research

This invention was not made under contract with an agency of the US Government, nor by any agency of the US Government.

BACKGROUND OF THE INVENTION

One problem encountered during shoveling is that it may be necessary to pick up a discrete object from a surface composed of smaller particulate matter. For example, when leveling sand for a layer of "pavers" (blocks of masonry used to construct a stone surface), a shovel user may notice a pebble or leaf that has blown onto the sand. After a windstorm, a large number of such minor bits of debris may be present. However, when attempting to shovel up such items, the user inevitably is left with a large quantity of the sand which is scooped up into the shovel scoop with the pebble or leaf.

A number of similar problems occur. Cleaning a beach or child's sand box, for example, may entail picking up broken glass or toys from among sand, preferably without the large quantity of sand which is inevitably scooped up with it. Cleaning a pet's "litter box" means picking up particularly noxious items from a matrix of small particles of litter. Picking up larger items from a bed of leaves, gravel or moss may pose similar problems.

One solution is a "sifter" type of filter device. A screen may be used to allow smaller particles to fall away while the items sought for removal are removed. This may be practical for certain limited applications and cases in which the user is willing to have a dedicated device having no use but filtering. However, such devices have a substantial disadvantage in that they are not useful for moving the filtered particles if that is needed, cannot be used to shovel and so on.

It would be advantageous to provide a device usable as both a shovel and a filter.

SUMMARY OF THE INVENTION

General Summary

The present invention teaches a shovel having a scoop with a bottom perforated by apertures and a movable sifting plate held in one of a plurality of possible positions by means of a retainer plate. The sifting plate may have apertures which do not overlap the apertures of the scoop in a first position, thus keeping the bottom of the shovel scoop closed for use as a shovel. In a second position, the sifting plate apertures may overlap the apertures of the scoop bottom so as to provide a degree of sifting ability. Either set of apertures may have a screen thereacross.

The retaining plate may be biased by a spring so as to hold the sifting plate in position. The retaining plate spring may sit on a post projecting from the retaining plate, under pressure from an arm projecting from the scoop. A tab, pin, or other projection from the retaining plate may pass through the sifting plate at a positioning slot and into a retaining slot in the scoop, thereby preventing motion of the sifting plate unless the retaining plate is moved, against the urging of the spring, into a position at which the tab does not project through the positioning slot into the retaining slot.

Summary in Reference to Claims

It is therefore a first aspect, advantage, objective and embodiment of the invention to provide a shovel comprising:

a shovel having a scoop portion and a shovel handle portion;

the scoop portion having a bottom, a leading edge, and a side, the bottom having at least one first sifting opening therethrough, the side having at least one retaining aperture thereinto;

a sifting plate having at least one second sifting opening therethrough and a plurality of positioning apertures therethrough; and a retaining plate having a tab dimensioned and configured to pass through at least one of the positioning apertures and into the retaining aperture in a first position, the tab not passing into the retaining aperture in a second position, the retaining plate having a spring urging it into the first position.

It is therefore another aspect, advantage, objective and embodiment of the invention to provide a shovel, further comprising:

a retaining plate handle attached to the retaining plate, the retaining plate handle dimensioned and configured to provide a secure hand grip when the retaining plate is pulled against the spring into the second position.

It is therefore another aspect, advantage, objective and embodiment of the invention to provide a shovel, further comprising:

at least one retaining arm projecting upward from the scoop side, at least one post projecting upward from the retaining plate, the spring disposed under compression on the post and between the retaining arm and the retaining plate.

It is therefore another aspect, advantage, objective and embodiment of the invention to provide a shovel, wherein the retaining plate further comprises: a slanted side dimensioned and configured to engage the scoop side.

It is therefore another aspect, advantage, objective and embodiment of the invention to provide a shovel, further comprising:

at least one sifting plate retainer projecting upwards from the scoop and cantilevered over at least one edge of the sifting plate.

It is therefore another aspect, advantage, objective and embodiment of the invention to provide a shovel wherein the first and second sifting openings comprise rectangular apertures arranged with the long axis of the rectangle parallel to the leading edge.

It is therefore another aspect, advantage, objective and embodiment of the invention to provide a shovel, wherein the first and second sifting openings are identical in dimension and configuration.

It is therefore another aspect, advantage, objective and embodiment of the invention to provide a shovel wherein a first of the plurality of positioning apertures through the sifting plate is positioned so that when the tab of the retaining plate passes therethrough and into the retaining aperture, the sifting plate is positioned in a first sifting plate position wherein the first and second sifting openings do not overlap and the shovel scoop bottom is entirely closed.

It is therefore another aspect, advantage, objective and embodiment of the invention to provide a shovel, wherein a second of the plurality of positioning apertures through the sifting plate is positioned so that when the tab of the retaining plate passes therethrough and into the retaining aperture, the sifting plate is positioned in a second sifting plate position wherein the first and second sifting openings overlap by a first percentage of the surface area of the scoop bottom.

It is therefore another aspect, advantage, objective and embodiment of the invention to provide a shovel, wherein a third of the plurality of positioning apertures through the sifting plate is positioned so that when the tab of the retaining plate passes therethrough and into the retaining aperture, the sifting plate is positioned in a third sifting plate position wherein the first and second sifting openings overlap by a second percentage of the surface area of the scoop bottom.

It is therefore another aspect, advantage, objective and embodiment of the invention to provide a shovel wherein a screen is positioned across and attached to one member selected from the group consisting of: first sifting opening, second sifting opening, and combinations thereof.

It is therefore yet another aspect, advantage, objective and embodiment of the invention to provide:
 a shovel having a scoop portion and a shovel handle portion;
 the scoop portion having a bottom, a leading edge, and a side, the bottom having at least one first sifting opening therethrough, the side having a plurality of retaining apertures;
 a sifting plate having at least one second sifting opening therethrough and at least one positioning apertures therethrough; and
 a retaining plate having a tab dimensioned and configured to pass through the positioning aperture and into at least one of the retaining aperture in a first position, the tab not passing into the retaining aperture in a second position, the retaining plate having a spring urging it into the first position.

It is therefore yet another aspect, advantage, objective and embodiment of the invention to provide a shovel comprising:
 a shovel having a scoop portion and a shovel handle portion;
 the scoop portion having a bottom, a leading edge, and a side, the bottom having at least one first sifting opening therethrough;
 a sifting plate having at least one second sifting opening therethrough; and
 a retainer having a first position, the retainer dimensioned and configured to prevent motion of the sifting plate when in a first position, the retainer having a spring urging it into the first position.

BRIEF DESCRIPTION OF THE DRAWINGS

FIG. 1 is a partially exploded near-frontal perspective view of the first embodiment of the invention.

FIG. 1a is a partial cross-sectional view of the retaining plate spring mechanism of the invention.

FIG. 2 is a frontal view of the scoop bottom, scoop sides, sifting plate and sifting plate retainers of the invention.

FIG. 3 is a side view of a second embodiment of the invention in which the retaining slots do not pass entirely through the sides of the scoop and the retainer plate sits entirely within the interior of the scoop.

INDEX TO THE REFERENCE NUMERALS

Figure 4:
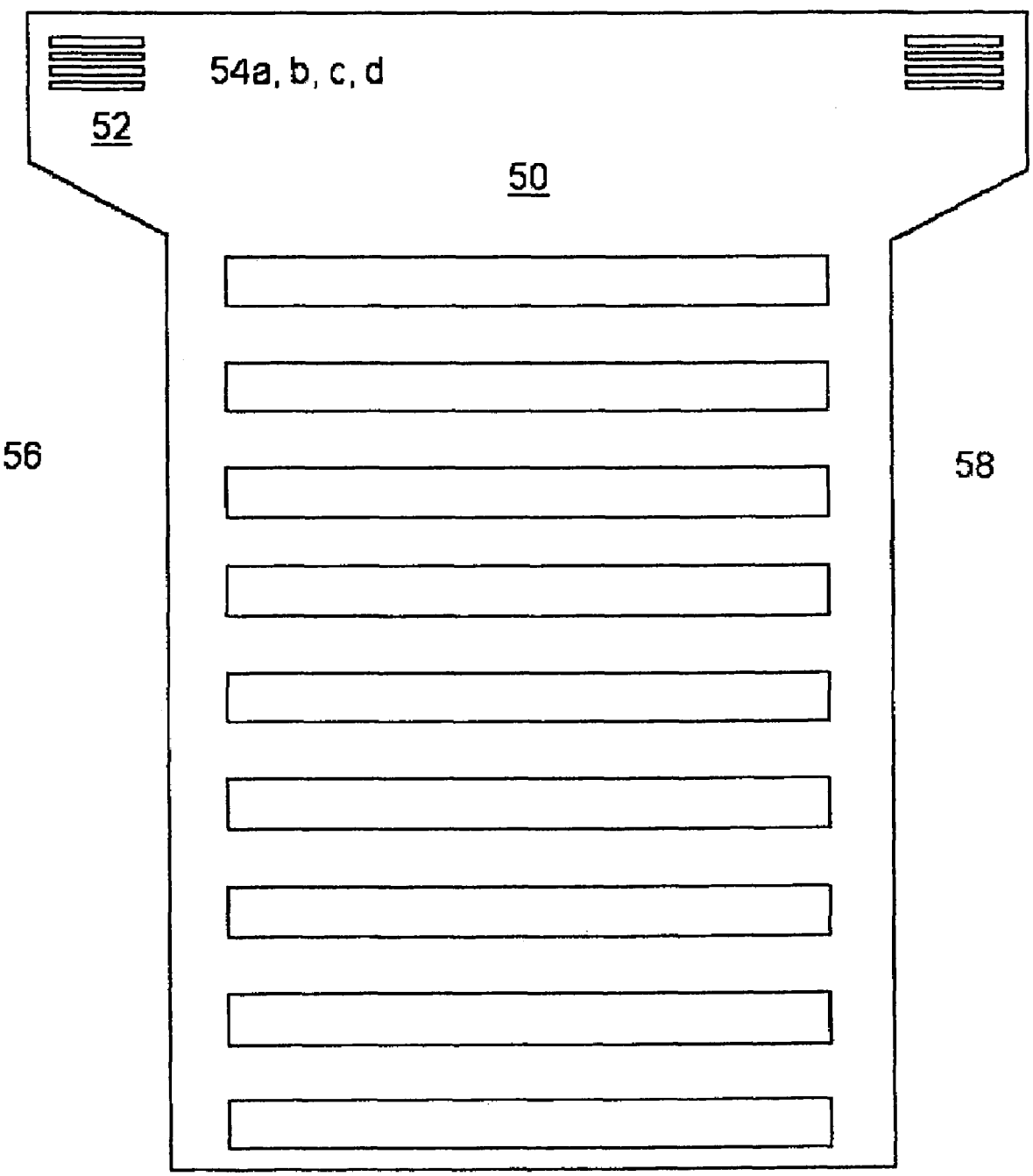
FIG. 4 is a planform view of a third sifting plate embodiment of the invention.

First embodiment 10
Scoop 12
Retaining plate 14
Retaining plate handle 16
Plate body 20
Post 22
Slanted side 24
Tab 26
Retaining arms 28
Retaining slots 30
First side 32
Second side 34
Leading edge 36
Back side 38
Bottom 40
Retaining clips 42, 42a
Retaining spring 44
Sliding sifting plate 46
Scoop handle 48
Sifting plate upper portion 50
Extension 52
Positioning slots 54a, b, c, d
Sifting openings 56
Blocked areas 58
Retaining slots 60a, b, c, d
Sifting openings 66
Blocked areas 68

DETAILED DESCRIPTION

FIG. 1 is a partially exploded near-frontal perspective view of the first embodiment of the invention, one of the presently preferred embodiments and best mode presently contemplated for carrying out the invention. FIG. 1a is a partial cross-sectional view of the retaining plate spring mechanism of the invention. First embodiment 10 has scoop 12 and retaining plate 14, which comprise two of the three major components of the invention. Retaining plate handle 16 may be used to pull retaining plate 14 away from scoop 12 in order to allow adjustment of the degree of blocking versus filtering area of the scoop 12. Plate body 20 may be dimensioned and configured in much the same shape as the back of the scoop 12 or the cross-section of the scoop 12. Post 22 may sit near (or directly above) slanted side 24 having tab 26 projecting therefrom. Retaining arm 28 may project from scoop 12 above or near retaining slots 30 on first side 32 and second side 34. Retaining slots 30 may pass all the way through sides 32, 34, or may in embodiments merely pass into the scoop at some point, still serving the same function. (In the strongly frontal oblique view of FIG. 1, the retaining slots may be foreshortened.) Sides 32, 34 may be angled at an angle such as 45 degrees, within a wide range of plus or minus 20 degrees or more. In the presently preferred embodiment and best mode now contemplated, the angle is approximately 45 to 55 degrees. One factor to consider is that the angle should promote smooth positive motion and locking by the tab 26 through the apertures on the plate and scoop. Note that slanted side 24 may be dimensioned and configured to match the sides 32, 34, for example by having the same angles and lengths or complementary angles and lengths.

Leading edge 36 may be a normal shovel blade edge, useful for either scooping or shoveling. Back side 38 may comprise the back side of the scoop 12 and may prevent materials scooped or shoveled from falling off of the back end of the scoop 12.

Bottom 40 is of particular interest. In addition to retaining clips 42, it may have a series of apertures (better seen in FIG. 6 as they are foreshortened by perspective in FIG. 1) therethrough. These apertures will allow the scoop 12 to function as a filter when they are not completely occluded. Retainer clips 42 may be punched upwards from the material of the scoop bottom 40 and shaped to suit their function, or may be additional projections from the scoop bottom 40.

Retaining spring 44 sits on post 22 in this embodiment, but may be otherwise secured in alternative embodiments. It sits under compression between retaining plate 20 and arm 28, thus urging retaining plate 20 downwards. It will be appreciated that spring 44 may advantageously be situated close to tab 26 so as to directly urge tab 26 through slots on the other parts of the device.

FIG. 2 is a frontal view of the scoop bottom, scoop sides, sifting plate and sifting plate retainers of the invention. Retaining clips 42 and 42a may be seen to retain sliding sifting plate 46 securely on at least one surface of scoop bottom 40. Sifting plate 46 may thus slide along the front to back axis of scoop 12 but not lift out from scoop 12 nor slide sideways to significant degrees.

In embodiments, retaining clips 42 may be oriented in a different direction, so that sifting plate 46 may slide in a different direction but is still retained securely against scoop 12 bottom 40.

FIG. 3 is a side view of a second embodiment of the invention in which the retaining slots do not pass entirely through the sides of the scoop and the retainer plate sits entirely within the interior of the scoop, invisible from the side. Side 32 thus hides the retainer plate.

Scoop handle 48 may be a one hand handle for a short scoop such as may advantageously be used for pet litter boxes, or may be longer for gardening work, or may be extensible, removable, etc.

FIG. 4 is a planform view of a third sifting plate embodiment of the invention. Sifting plate upper portion 50 may have projecting therefrom extension 52 which has thereon positioning slots 54a, b, c, d.

Tab 24 (FIG. 1) may pass through one selected positioning slot 54a when the sifting plate 46 is in a first position, and may pass through a different selected positioning slot 54b when the sifting plate 46 is in a second position, through a third positioning slot 54c in a third position, and so on.

Sifting openings 56 and blocked areas 58 may be seen to cover the portion of sifting plate 46 which covers portions of scoop 12 bottom 40. Thus when the sifting plate 46 is in a first position, the blocking areas 58 may cover a first percentage of the apertures through the bottom 40 of scoop 12. When the sifting plate 46 is in a second position, the blocking areas 58 may cover a second percentage of the apertures through the bottom 40 of scoop 12. When the sifting plate 46 is in a third position, the blocking areas 58 may cover a third percentage of the apertures through the bottom 40 of scoop 12. One of the percentages covered may be 100% in the presently preferred embodiment and best mode presently contemplated for carrying out the invention, thus allowing the bottom 40 to be closed, allowing no sifting action but allowing use as a spade or shovel or traditional scoop.

Figure 5:
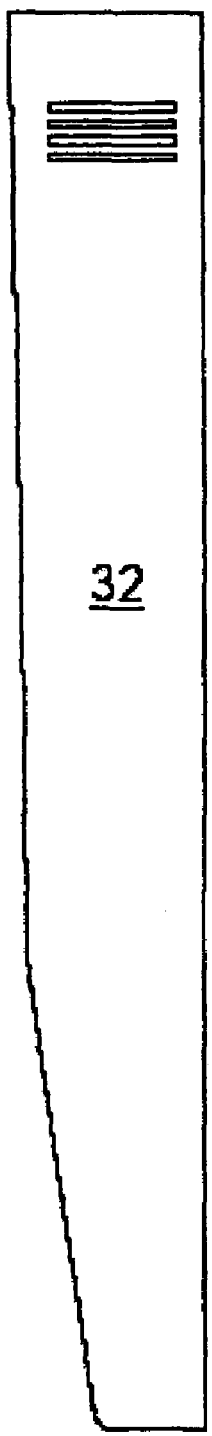
FIG. 5 is a side view of a scoop of a fourth embodiment of the invention, in which there are multiple retaining slots to allow positioning of the retaining plate.
Figure 6:
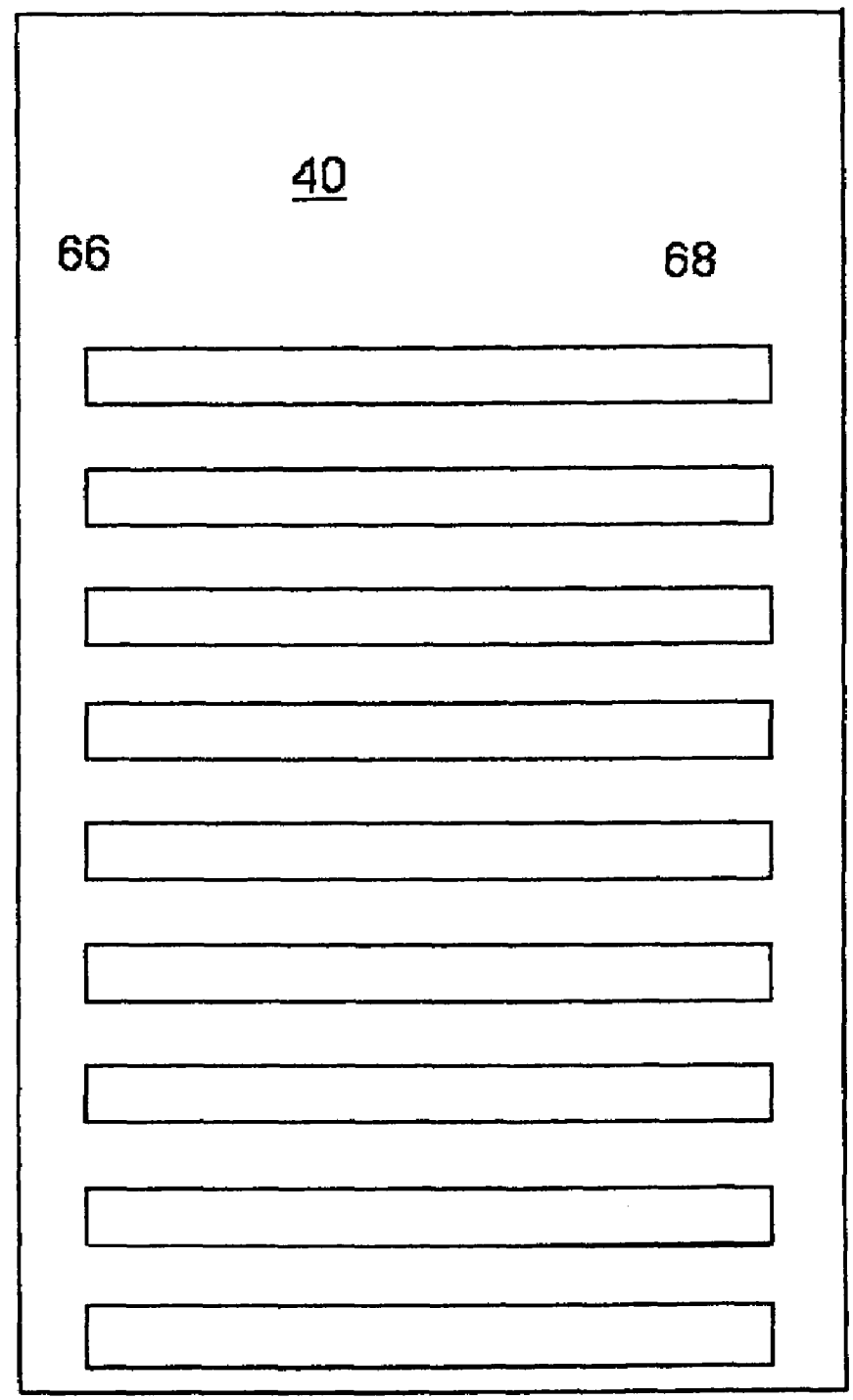
FIG. 6 is a planform view of a fifth scoop bottom according to the invention.

FIG. 5 is a side view of a scoop of a fourth embodiment of the invention in which there are multiple retaining slots to allow positioning of the retaining plate. Thus in this embodiment, there are multiple slots through the scoop 12 sides (32, 34) in order to allow a plurality of different positions of the sliding sifting plate 46. FIG. 6 is a planform view of a fifth scoop bottom according to the invention. Sifting openings 66 and blocked areas 68 may be the same width as the sifting openings 56 and blocked areas 58 of the sliding sifting plate 46, or they may be different widths, or even different lengths.

Retaining slots 60a, b, c, d pass entirely through the side 32 and allow multiple sift plate positions even in alternative embodiments in which there is only one positioning slot 54a on the sliding sift plate. However, in the best mode now contemplated, there may be multiple slots on both scoop and plate, so that a wide variety of different positions may be attained.

As an example, consider a simple embodiment in which apertures and blocking areas have the same width (in alternative and more complex embodiments, apertures and blocking areas may have differing widths, or the apertures/blocks of the scoop bottom may be of different widths than those of the sifting plate). If each of retaining slots 60a, b, c, d is positioned at a distance from the next retaining slot equivalent to 25% of the width of the apertures/blocks, then merely by using the retaining slots, a user may select degrees of opening (or alternatively, degrees of occlusion) of the apertures corresponding to 0, 25%, 50%, and 75% of the width of the openings. Now if the positioning slots 54a, b, c, d having mutual distances of multiples of 5% of the aperture/block width, they may be used to achieve opening percentages of 0%, 5%, 10% and 15%, but also, be using both sets of apertures, a total exemplary selection of opening distances of 0%, 5%, 10%, 15%, 25%, 30%, 35%, 40%, 50%, 55%, 60%, 65%, 75%, 80%, 85% and 90% of the total widths. This simplified example misses some opening widths (100%, 95%, 70%, 45%, and 20%) but it will be appreciated that merely adding one more slot to either scoop or sifting plate will remedy this, and thus any size of opening may be secured, as well as an extremely wide variety of percentages of the opening.

It is anticipated that there will be little need for screens on the apertures of either shovel scoop or sliding sifting plate, due to the extreme flexibility in choosing aperture sizes which the design allows, however, screens may be added across the apertures of either scoop bottom or sifting plate in embodiments.

The disclosure is provided to allow practice of the invention by those skilled in the art without undue experimentation, including the best mode presently contemplated and the presently preferred embodiment. Nothing in this disclosure is to be taken to limit the scope of the invention, which is susceptible to numerous alterations, equivalents and substitutions without departing from the scope and spirit of the invention. The scope of the invention is to be understood from the appended claims.

What is claimed is:

1. A shovel comprising:

a shovel having a scoop portion and a shovel handle portion;

the scoop portion having a bottom, a leading edge, and a side, the bottom having at least one first sifting opening therethrough, the side having at least one retaining aperture thereinto;

a sifting plate having at least one second sifting opening therethrough and a plurality of positioning apertures therethrough; and a retaining plate having a tab dimensioned and configured to pass through at least one of the positioning apertures and into the retaining aperture in a first position, the tab not passing into the retaining aperture in a second position, the retaining plate having a spring urging it into the first position the retaining plate further comprising a slanted side dimensioned and configured to engage the scoop side, and a retaining plate handle attached to the retaining plate, the retaining plate handle dimensioned and configured to provide a secure hand grip when the retaining plate is pulled against the spring into the second position and at least one retaining arm projecting upward from the scoop side, at least one post projecting upward from the retaining plate, the spring disposed under compression on the post and between the retaining arm and the retaining plate and wherein a first of the plurality of positioning apertures through the sifting plate is positioned so that when the tab of the retaining plate passes therethrough and into the retaining aperture, the sifting plate is positioned in a first sifting plate position wherein the first and second sifting openings do not overlap and the shovel scoop bottom is entirely closed and wherein a second of the plurality of positioning apertures through the sifting plate is positioned so that when the tab of the retaining plate passes therethrough and into the retaining aperture, the sifting plate is positioned in a second sifting plate position wherein the first and second sifting openings overlap by a first percentage of the surface area of the scoop bottom and wherein a third of the plurality of positioning apertures through the sifting plate is positioned so that when the tab of the retaining plate passes therethrough and into the retaining aperture, the sifting plate is positioned in a third sifting plate position wherein the first and second sifting openings overlap by a second percentage of the surface area of the scoop bottom.

2. The shovel of claim 1, further comprising:

at least one sifting plate retainer projecting upwards from the scoop and cantilevered over at least one edge of the sifting plate.

3. The shovel of claim 1, wherein the first and second sifting openings comprise rectangular apertures arranged with the long axis of the rectangle parallel to the leading edge.

4. The shovel of claim 1, wherein the first and second sifting openings are identical in dimension and configuration.

5. The shovel of claim 1, wherein a screen is positioned across and attached to one member selected from the group consisting of: first sifting opening, second sifting opening, and combinations thereof.

* * * * *